United States Patent
Yanan et al.

(10) Patent No.: US 11,388,264 B1
(45) Date of Patent: *Jul. 12, 2022

(54) DATA PROCESSING SYSTEMS FOR DATA REQUEST ROUTING

(71) Applicant: Bank of America Corporation, Charlotte, NC (US)

(72) Inventors: Frank J. Yanan, Wheaton, IL (US); William Anderson Hodges, Mechanicsville, VA (US)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/464,858

(22) Filed: Sep. 2, 2021

(51) Int. Cl.
*G06F 9/44* (2018.01)
*G06Q 10/00* (2012.01)
*G16H 10/60* (2018.01)
*H04L 67/63* (2022.01)
*H04L 61/5007* (2022.01)
*H04L 67/5682* (2022.01)

(52) U.S. Cl.
CPC .......... *H04L 67/63* (2022.05); *H04L 61/5007* (2022.05); *H04L 67/5682* (2022.05)

(58) Field of Classification Search
CPC ............... H04L 67/327; H04L 61/2007; H04L 67/2852
See application file for complete search history.

(56) References Cited

U.S. PATENT DOCUMENTS

| | | | |
|---|---|---|---|
| 6,345,239 B1* | 2/2002 | Bowman-Amuah | G06Q 30/0639 705/26.9 |
| 6,606,744 B1* | 8/2003 | Mikurak | H04L 65/104 717/174 |
| 8,396,811 B1 | 3/2013 | Hahn-Carlson | |
| 8,560,366 B2* | 10/2013 | Mikurak | G06Q 10/06 705/7.12 |
| 9,722,895 B1 | 8/2017 | Sarukkai et al. | |
| 10,510,031 B2 | 12/2019 | Barday et al. | |
| 11,030,327 B2 | 6/2021 | Brannon | |
| 2013/0211872 A1 | 8/2013 | Cherry et al. | |
| 2014/0122163 A1 | 5/2014 | Simpson et al. | |
| 2018/0129989 A1 | 5/2018 | Bowers | |
| 2020/0027097 A1 | 1/2020 | Sargent | |

* cited by examiner

*Primary Examiner* — Christopher B Robinson
(74) *Attorney, Agent, or Firm* — Weiss & Arons LLP

(57) ABSTRACT

Apparatus and methods for call management is provided. The apparatus may include system architecture comprising a first I/O platform, a processing engine and a second I/O platform. The first I/O platform may receive a call from a calling source and augment the call by pulling data from a calling sources database. The call may then be routed to the processing engine for a determination of whether cached data can satisfy a data request stored in the call. If the cached data cannot respond to the data request in the call, the processing engine may transmit the call to the second I/O platform. The second I/O platform may leverage a vendor data intelligence engine for selecting an appropriate data source to receive the call. The second I/O platform may subsequently format the call for transmission to the appropriate data source and, after the formatting, route the call.

20 Claims, 4 Drawing Sheets

DATA PROCESSING SYSTEMS FOR DATA REQUEST ROUTING

FIELD OF TECHNOLOGY

Aspects of the disclosure relate to call management. In particular, the disclosure relates to call management that leverages calling source data, vendor data and internal data.

BACKGROUND

Enterprise systems typically generate large volumes of calls to a large variety of vendors to obtain data to satisfy the system's large variety of data needs. Typically, each group within the system uses their own platform for vendor calls. Each of these disparate platforms call one or more vendors to obtain necessary information.

It is not uncommon for a first group within the enterprise system to generated calls that are also being generated by the second group. These additional calls can result in higher billing fees by the vendor. Additionally, multiple data requests to the vendor can result in system latency and longer response times.

It is desirable, therefore, to provide apparatus and methods for handling calls to avoid redundancy, allow for centralized vendor management, and provide real-time metrics and vendor selection. It is also desirable to provide caching of high-frequency information requested from vendors to further reduce calls made to vendors, increase response times and decrease network traffic.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
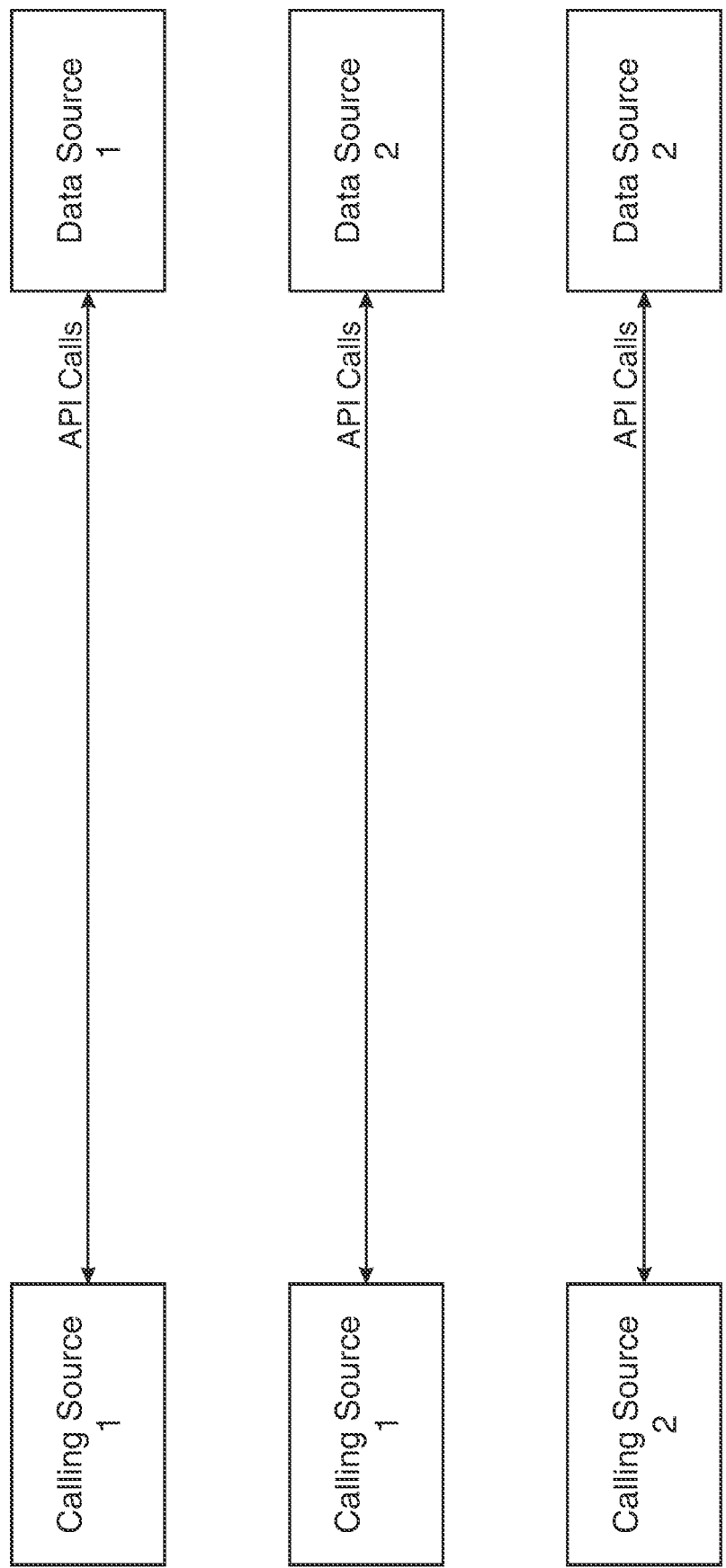
FIG. 1 shows apparatus and methods associated with the prior art.

Apparatus and methods for augmenting and routing calls is provided. The apparatus and methods may include a system architecture. The system architecture may augment and route calls requesting data. The system architecture may leverage calling source data, vendor data and internal data.

The system architecture may include a plurality of components. The components may include a first I/O platform, a processing engine, a second I/O platform, a vendor source broker and a vendor data intelligence engine. The components may also include one or more databases. The databases may include a calling sources database, an internal repository database, referred to alternately herein as an internal repository, a data source database and an intermediate cache.

The components are described herein as performing one or more functions. It is to be understood that the components are configured to perform the functions described herein.

The first I/O platform may receive a call from a calling source. The call may include a first data request and a transaction indicator. The call may be received by the calling source. The call may include call identifying information that may identify the calling source. The call may include an IP address that identifies the call, however it is to be understood that any other suitable indicator may be used to identify the call in addition to or in place of the IP address, such as hardware address or a MAC address or data in the call itself that identifies the calling source. The transaction indicator may specify how current a piece of data must be to satisfy the first data request. For example, when the first data request is a request for the weather, the transaction indicator may be '5 hours.' When the first data request is a request to validate a phone number of a caller attempting to make a large wire transaction, the transaction indicator may be '5 minutes.'

The calling source may generate the call. The call may be populated with the first data request and the transaction indicator. The calling source may transmit the call to the first I/O platform. The calling source may receive from the first I/O platform a response to the calling source's first data request as described below. In some embodiments, the call may not identity a data source from which the data is to be obtained. In some embodiments, the call may identify a data source from which the data is to be obtained. It is to be understood that the methods performed herein for a call received from a calling source may be performed for a plurality of calls received from a plurality of calling sources. It is to be further understood that the methods performed herein may be used for a call that needs to be routed to two or more data sources. Thus, the invention provides for routing, processing and intelligent management of a large number of calls from many calling sources for efficient and intelligent enterprise call management.

The first I/O platform may push the IP address to the calling sources database. The calling sources database may retrieve a calling source indicator and a second data type associated with the IP address. The calling sources database may store a list of approved IP addresses that signed up with the system architecture. The calling sources database may query the list of approved PI addresses to determine if the IP address received from the first I/O platform is included in the list. If the IP address is not stored in the calling sources database, the calling sources database may return a null result, or a failure message. Upon receipt of the null result/failure message, the first I/O platform may delete the call.

Functions described as being performed by the calling sources database may instead be performed by the first I/O platform. For example, the first I/O platform may query the calling sources database for the calling source indicator and the second data type, and pull the queried data when it is identified in the calling sources database. In these embodiments, data described as being transmitted from the calling sources database to the first I/O platform may instead be pulled by the first I/O platform from the calling sources database.

When the calling sources database has stored the IP address, the calling sources database may push to the first I/O platform data associated with the IP address in the calling sources database. In some embodiments, the data transmitted may include a calling source indicator and a second data type. The calling source indicator may be a sequence of numbers and/or letters identifying the calling source from which the call was generated. Other components of the system architecture may use the calling source indicator to retrieve and store data associated with the call. The second data type may be an additional piece of data that was not requested by the call's first data request, but which must be added to the call based on a rule stored in the calling sources database. The rule may be associated with the IP address.

The first I/O platform may augment the call to include a second data request. The second data request may request the second data type. The first I/O platform may tag the call with the calling source indicator. In exemplary embodiments, the first I/O platform may add a data string to the call that includes the second data request and the calling source indicator. The second data request may be a request for the second data type. After the augmenting, the first I/O platform may transmit the call to a processing engine.

For example, the first I/O platform may receive first data from the calling source including a transaction type, name, address and phone number, the first data being included in a first data request for a customer authentication. The first I/O platform may then query the calling sources database and retrieve from the calling sources database second data type(s). The second data types(s) may include one or more of phone intelligence, credit bureau perspective and a synthetic account assessment. The first I/O platform may then transmit to the processing engine a call including a first data request for customer authentication and a second data request for the second data type(s). In some of these embodiments, the data source may populate a data request associated with the second data.

In some embodiments, the call received by the first I/O platform from the calling source may include a first data field for receiving the first data requested in the first data request. In some of these embodiments, the augmenting of the call by the first I/O platform may include the first I/O platform adding a second data field to the call, the second data field for receiving the second data requested in the second data request. In some of these embodiments, the response received from the data source may include the first data field populated with the first data and the second data field populated with the second data.

The processing engine may receive the call from the first I/O platform. In response to receiving the call, the processing engine may transmit the first data request, the second data request and the transaction indicator to an intermediate cache. In response to receiving, from the intermediate cache, data for fulfilling the first data request, the second data request and the transaction indicator, the processing engine may populate the call with the received data and transmit the call to the first I/O platform for routing to the calling source.

The intermediate cache may store a plurality of data pushed to the intermediate cache by the vendor data intelligence engine.

In exemplary embodiments, each piece of stored data may be associated with a time stamp. The time stamp may reflect a time at which the piece of stored data was generated. The intermediate cache may receive the first data request, the second data request and the transaction indicator from the processing engine. The intermediate cache may determine, for the first data request, if data stored in the intermediate cache satisfies the first data request and the transaction indicator. For the second data request, the intermediate cache may determine if data stored in the cache satisfies the second data request and the transaction indicator. When the intermediate cache is determined to store data satisfying the first data request, the second data request and the transaction indicator, the intermediate cache may transmit to the processing engine data for fulfilling the first data request, the second data request and the transaction indicator.

In exemplary embodiments, when the processing engine identifies multiple queries coming through for the same individual (e.g., the individual is opening multiple accounts at same time), the processing engine may store the calls in a temporary storage queue and first query the internal repository to see if local data can satisfy the requests without having to send the call off to the data source.

In response to receiving a null result from the intermediate cache, the processing engine may transmit the call to a second I/O platform. The intermediate cache may transmit a null result to the processing engine when the intermediate cache determines that the cache does not store data satisfying the first data request and the transaction indicator, and that the cache does not store data satisfying the second data request and the transaction indicator.

The second I/O platform may receive the call from the processing engine. In response to receipt of the call from the processing engine, the second I/O platform may push the IP address, the first data request, the second data request and the transaction indicator to a vendor source broker engine. In some embodiments, the calling source indicator may be pushed to the vendor source broker engine in place of the IP address. The second I/O platform may receive, from the vendor source broker engine, a data source and a call format. The data source may be an API data source. The call format may be an API call format.

The vendor source broker may receive from the second I/O platform the IP address, the first data request, the second data request and the transaction indicator. The vendor source broker may pull from a database one or more prestored requirements associated with the IP address or, in some embodiments, the calling source indicator. The vendor source broker may identify the data source, the data source satisfying the one or more prestored requirements associated with the IP address/calling source indicator and transmit to the second I/O platform the data source and the call format. The selected data source may be based on the IP address/ calling source indicator and the transaction indicator.

The vendor source broker may use stored rules to identify the data source. For example, the rules may determine that, for data requests requesting similar or identical information, such data requests must be transmitted equally between two data sources. Upon a lapse of a time period, the vendor source broker may then use the performance history of the two data sources to select which data source to use exclusively going forward.

For example, in exemplary embodiments, the vendor source broker may receive from the second I/O platform the IP address, the first data request, the second data request and the transaction indicator. The vendor source broker may pull from a database a one or more prestored requirements associated with the first data request. The vendor source broker may identify the data source, the data source satisfying the one or more prestored requirements associated with the first data request and transmit to the second I/O platform the data source and the call format.

The vendor source broker may receive, from the second I/O platform, the metrics associated with the data source response. The vendor source broker may store vendor source metrics relating to data received from the vendor. The vendor source broker may store performance metrics together with historical performance metrics of the data source. The vendor source broker may process the performance metrics and the historical performance metrics to determine if the data source has fails to meet a threshold performance indicator. If the data source is determined to have failed to meet the threshold performance indicator, the vendor source broker may remove the data source from a list of approved data sources stored by the vendor source broker.

The second I/O platform may format the call to conform to the call format. After the formatting, the second I/O platform may push the call to the data source. The second I/O platform may then receive from the data source a response to the call. The response may include first data and second data. The first data may satisfy the first data request. The second data may satisfy the second data request.

The second I/O platform may transmit to the vendor source broker engine performance metrics associated with the response received from the data source. The second I/O platform may transmit the response to both a vendor data intelligence engine and the processing engine. The responses to the vendor data intelligence engine and the processing engine may be transmitted in parallel.

The vendor data intelligence engine may receive the response from the second I/O platform. The vendor data intelligence engine may execute a determination whether to store, in the intermediate cache, one or both of the first data and the second date.

In some embodiments, the vendor data intelligence engine may temporarily store all data received from the second I/O platform in a holding file. The holding file may automatically purge each piece of data in the holding file when the piece of data has been stored in the holding file for more than a predetermined time period. The vendor data intelligence engine may receive the response from the second I/O platform. The vendor data intelligence engine may store the response in the holding file. The vendor data intelligence engine may push the response to the intermediate cache, for storage in the intermediate cache, when the holding file is determined to be storing one or more pieces of information identical to the response.

In some embodiments, the vendor data intelligence engine may receive, from the second I/O platform, a plurality of calls. The plurality of calls may include the call. The vendor data intelligence engine may temporarily store the plurality of calls received from the second I/O platform in the holding file. The holding file may automatically purge each of the plurality of calls in the holding file when the each of the plurality of calls has been stored in the holding file for more than a predetermined time period. When the holding file is determined to be storing a predetermined number of calls, each of the predetermined number of calls requesting an identical piece of information, the vendor data intelligence engine may generate a request to the second I/O platform for the piece of information. The vendor data intelligence engine may then set up a feedback loop, that recurrently transmits the request to the second I/O platform upon the lapse of a time period to keep the intermediate cache updated with the data that has been shown to be often requested by the calling sources.

The processing engine may receive the response from the second I/O platform. The processing engine may extract from the response the first data and the second data. The processing engine may push to an internal repository the calling source, the first data and the second data. The processing engine may receive, from the internal repository, a third data field loaded with third data. The third data field may only be received when a rules database stored in the internal repository stores a rule associating receipt of one or more of the first data, the second data and/or the calling source with the triggering of transmission of the third data to the processing engine.

For example, the processing engine may store internal data relating to transactions bounced from certain account numbers. When the first data includes user identification information, and the internal repository has stored data relating to a transaction executed by the user that subsequently bounced, transaction data relating to the bounce may be the third data transmitted back to the processing engine. The rule stored in the internal repository that may trigger the transmission of the transaction data back to the processing engine may be 'if data received from processing engine identifies a customer, and the calling source identifier is associated with an online banking or a mobile banking application, search internal repository for anomalous transaction behavior relating to the customer and, if data is found, transmit back to processing engine.'

The processing engine may store rules determining when to query the internal repository. Specifically, calls associated with specific call source indicators may trigger the processing engine to query the internal repository. For such calls, the processing engine may pull data from the internal repository in a data call/lookup.

The processing engine may process the first data, the second data and, in some embodiments, the third data to output a response. The response may be a binary response, such as 'yes' or 'no.' The output may be any other suitable response, such as 'proceed', 'low risk,' 'high risk,' etc. The binary response may not include the first data, the second data or the third data. The response may include the binary response and some or all of the first data, the second data and the third data.

In some embodiments, the third data stored in the internal repository may override the first data and the second data received from the data source. For example, the processing executed by the processing engine on the first data and the second data, may output a second binary output. The processing executed by the processing engine on the first data, the second data and the third data, however, may output the first binary output.

For example, the processing engine may process a response received from a calling source and determine that a high-risk transaction pending for a bank account appears to be fine, since data source data shows that a phone number is current and owned by a customer who owns account, the account is not a synthetic account, and the credit bureau has no flags on account owner. The processing engine may then pull data from the internal repository related to the bank account for further analysis of the high-risk transaction. The internal repository may store data associated with the bank account showing an odd login IP address and a recent password change. This internal repository data, or 'third data,' when processed by the processing engine, may be result in the processing engine outputting a binary response 'high risk,' which may be different from the 'low risk' response that would have been generated had only the data source data been processed.

The processing engine may store a plurality of rules. The rules may be used to process the data and provide the response. Each rule may be associated with the calling source identifier. As such, each calling source may receive a customized response based on the calling source's needs.

In exemplary embodiments, the calling source may be a credit card application or an online banking login application or an agent review. The transaction type may be either "regular login event" or "high value transaction." A response expected to be received by the calling source from the processing engine may be related to the trustworthiness of the event/transaction. An exemplary response for a call associated with the transaction type 'regular login event' may be either "trusted" or "step up authentication required." An exemplary response for a call associated with the transaction type 'high value transaction' may be either "trusted"

or "deny." The processing engine may determine which response to send back to the calling source by processing the data received from the data source and, in some embodiments, the internal repository. The determination may include determining if the data meets predetermined conditions for 'regular login event' or 'trusted.' For example, if the data received from the data source reports that the phone number of the cell phone from which the transaction request was initiated was recently purchased, and the user's credit score recently was lowered by a large amount, the determination may be 'set up authentication required.' However, if the phone number was registered on the user's name for a long period of time, and his credit score is steady, the determination may be 'trusted.' Any set of rules regarding how data is used to determine whether or not a login event is trusted or not trusted may be used as known to those skilled in the art.

The processing engine may transmit the response to the first I/O platform. The first I/O platform may route the response to the calling source.

The system architecture may include the calling source. In some embodiments, the call received by the first I/O platform from the calling source may include a first data source, in addition to one or more of the first data request and the transaction indicator. These embodiments may include apparatus and methods described herein.

In these embodiments, the second I/O platform, in response to receipt of the call from the processing engine, may push the IP address, the first data request, the second data request, the transaction indicator and the first data source to the vendor source broker engine. In some embodiments, the calling source indicator may be used in place of the IP address.

The vendor source broker may receive from the second I/O platform the IP address, the first data request, the second data request and the transaction indicator. The vendor source broker may then execute a determination whether the first data source, as included in the call, should be used to satisfy the first and second data requests.

In exemplary embodiments, the vendor source broker may query the data source database to determine if the first data source can be used to satisfy the data request that requires the first and second data, when the data request has been initiated by the IP address and needs to be current as set forth in the transaction indicator.

For example, in embodiments wherein the calling source is an online banking application, the first data source in the call may be a publicly-accessible website. The data source database may store a rule that for a call having IP address associated with an online banking application, a data source used for pulling any data associated with an account holder must be from a cloud-based vendor and not a website that can be accessed without having one or more passwords, contracts or meeting predetermined requirements. Thus, if either the first data request or the second data request is requesting account holder data, the vendor source broker may determine that the first data source cannot be used for the data requests in the call.

As such, if the first data source fails to satisfy one or more rules stored in the rules database that is associated with any of the first data request, the second data request, the IP address and/or the transaction indicator, the vendor source broker may execute a second query to identify a second data source to which the call may be transmitted.

The vendor source broker may pull from a database one or more prestored requirements associated with the IP address. The vendor source broker may identify, in the database, a command to overwrite the first data source with the second data source. A command may be returned, from the data source database, to overwrite the first data source with a second data source when the first data source fails to meet rule(s) stored in the data source database.

The vendor source broker may transmit to the second I/O platform the second data source and a call format associated with the second data source. The second I/O platform may receive, from the vendor source broker engine, the second data source and the call format. The second I/O platform may format the call to conform to the call format. The formatting of the call, performed by the second I/O platform, may include overwriting, in the call, the first data source with the second data source.

After the formatting, the second I/O platform may push the call to the second data source. The second I/O may subsequently receive from the second data source a response to the call, the response including first data and second data. Apparatus and methods describing herein relating to the receiving of a response from the first data source and routing the response to the calling source may be used in the embodiments when the response is received from the second data source as detailed above.

Apparatus and methods of the invention may include a method for providing routing and augmentation of calls requesting data.

The methods may include the calling source generating the call. The call may be populated with the first data request and the transaction indicator. The methods may include the calling source transmitting the call to the first I/O platform. The methods may include the calling source receiving the response from the first I/O platform. In some embodiments, the call generated by the calling source may not identify a data source from which the data is to be obtained. In some embodiments, the call generated by the calling source may include a first data source as described herein.

The methods may include receiving, at the first I/O platform, the call from a calling source. The call may include the first data request and the transaction indicator.

The methods may include pushing, using the first I/O platform, the IP address to a calling sources database. The methods may include retrieving, at the calling sources database, a calling source indicator and a second data type associated with the IP address. The methods may include transmitting, from the calling sources database to the first I/O platform, the calling source indicator and the second data type to the first I/O platform.

The methods may include augmenting, at the first I/O platform, the call to include the second data request and tagging the call with the calling source indicator. The second data request may request the second data type. After the augmenting, the methods may include transmitting the call from the first I/O platform to a processing engine.

In some embodiments, the call received by the first I/O platform from the first calling source may include a first data field for receiving the first data requested in the first data request. In some of these embodiments, the augmenting of the call by the first I/O platform may include the first I/O platform adding a second data field to the call. The second data field may be configured for receiving the second data requested in the second data request. In some of these embodiments, the response received from the data source may include the first data field populated with the first data and the second data field populated with the second data.

The methods may include receiving the call at the processing engine. In response to receiving the call, the processing engine may perform one or more of the method steps of: transmitting the first data request, the second data request and the transaction indicator to an intermediate cache; in response to receiving, from the intermediate cache, data for fulfilling the first data request, the second data request and the transaction indicator, populating the call with the received data and transmitting the call to the first I/O platform for routing to the calling source; and, in response to receiving a null result from the intermediate cache, transmitting the call to a second I/O platform.

The methods may include the intermediate cache receiving the first data request, the second data request and the transaction indicator from the processing engine. For the first data request, the intermediate cache may determine if data stored in the cache satisfies the first data request and the transaction indicator. For the second data request, the intermediate cache may determine if data stored in the cache satisfies the second data request and the transaction indicator. If the cache is determined to store data satisfying the first data request, the second data request and the transaction indicator, the methods may include the intermediate cache transmitting data to the processing engine for fulfilling the first data request, the second data request and the transaction indicator.

The methods may include receiving the call from the processing engine at the second I/O platform. In response to receipt of the call from the processing engine, the methods may include the second I/O platform performing one or more of the method steps of: pushing the IP address, the first data request, the second data request and the transaction indicator to a vendor source broker engine; receiving, from the vendor source broker engine, a data source and a call format; formatting the call to conform to the call format; after the formatting, pushing the call to the data source; receiving from the data source a response to the call, the response including first data and second data; transmitting to the vendor source broker engine performance metrics associated with the response received from the data source; and, transmitting the response, in parallel, to both a vendor data intelligence engine and the processing engine.

The methods may include receiving, at the vendor data intelligence engine, the response from the second I/O platform. The methods may include executing, at the vendor data intelligence engine, a determination whether to store, in the intermediate cache, one or both of the first data and the second data. The methods may include receiving, at the processing engine, the response from the second I/O platform and using the processing engine to extract from the response the first data and the second data.

The methods may include processing the first data and the second data at the processing engine to output a response. The response may be any suitable response as detailed above. The response may not include the first data or the second data. The response may include the first data and/or the second data.

In some embodiments, the methods may include the processing engine receiving, from the internal repository database, a third data field loaded with third data. In some of these embodiments, the methods may include the processing engine processing the first data, the second data and the third data to output the response. The response may not include the first data, the second data or the third data.

The methods may include transmitting, from the processing engine to the first I/O platform, the response to the first I/O platform. The methods may include the first I/O platform routing the response to the calling source.

Illustrative functions that may be performed by various pieces of the system architecture are included in Table 1 below.

TABLE 1

Illustrative Functions of System Architecture Components

| System Architecture Component | Illustrative Functions |
| --- | --- |
| Calling Sources | Applications across a company that have a need for data from a data source and the intelligence that data provides<br>Utilizes standardized API calls and call format<br>Call data includes a transaction indicator for instances where the timeliness of desired data may vary based on circumstance, e.g. high risk transaction vs. regular transaction validation<br>Each calling source populates the call with the proper information for the data source to key on (e.g. name, address, SSN, device characteristics)<br>Data sources are set up in advance through an approval process to ensure that only known sources can call the service for security purposes and to capture up front what data each source expects to receive for each type of transaction type<br>Receives back complete and fully processed response for consumption |
| First I/O Platform | Manages, monitors, reports on all aspects of caller interaction<br>Sets up approved sources through an intake process<br>Manages calling sources database<br>Knows type of data required by the calling source based upon what was entered in the setup process and passed in the API, and shapes call to processing engine accordingly<br>Manages certificates and the security related to calling application handshake<br>Tracks calling source history - volumes, response time statistics, call patterns<br>Auto adjusts and intelligently customizes interaction with the calling source based on data (e.g. staging pre-processed common answer sets where appropriate)<br>Reports on calling source experience and overall effectiveness of service to all calling sources |

TABLE 1-continued

Illustrative Functions of System Architecture Components

| System Architecture Component | Illustrative Functions |
|---|---|
| | Bills/charges back for service costs based on calling source volumes/patterns |
| Calling Sources Database | Stores all approved calling sources and data requests for security purposes |
| | Stores data requirements for each calling source, including transaction type |
| | Stores security aspects such as approved IP source |
| | Records calling source history - volumes, response time statistics, call patterns |
| | Used for billing/chargeback models and data |
| Processing Engine | Gathers, processes, and returns all pertinent information from the right sources |
| | Formats request to second I/O platform |
| | Manages algorithm to know what data is time sensitive (most current) and when to source data from the intermediate cache vs outside data sources |
| | Has standardized consistent logic for how to ingest, parse, process data source information to a result calling sources can consume |
| | Consumes data from internal repository and factors into the processing of the request to provide more complete response |
| | Manages internal repository |
| Internal Repository | Stores internal data |
| | Stores additional internal data to enhance and adjust response to calling sources, e.g. when data requests include requests for authorization, sources store known unauthorized IP addresses, compromised accounts, known unauthorized actors/identities, activity alerts, fraud alerts |
| Second I/O Platform | Standardized API calls and call format to data sources |
| | Receives request and formats calls to proper data source(s) based on data from vendor source broker |
| | Receives standardized data set from data sources and passes to processing engine for processing |
| | Manages certificates and the security related to outside data sources call handshake |
| | Tracks data source history - volumes, response time statistics, call patterns |
| | Reports on data source experience and overall effectiveness of all data sources (e.g. response accuracy, response completion rates, response times, uptime, cost effectiveness) |
| Data Sources | Outside sources of data, such as contracted vendors or publicly available data repositories, such as publicly available websites |
| | Uses standardized API calls and call format |
| | Receives a call and passes back standardized data set |
| | Data sources may have set contracts that allow for multiple consumption approaches with different cost savings based on volume. Vendor data intelligence engine auto-adjusts consumption process and model based on traffic patterns and needs |
| | Exemplary data sources include credit bureaus, device authenticators, phone intelligence authenticators, synthetic ID checks, document authenticity checks, malware detection and IP look-ups |
| Vendor Source Broker | Manages proper alignment of the data source's data to the appropriate data source based on timing, volume and needs |
| | Determines appropriate data source(s) to call for which data based on the request |
| | Algorithm to swap data sources at any time without affecting processing |
| | Algorithm to shape traffic to outside data sources based on algorithm that factors in data such as time of day, cost, response time feedback, data source issues |
| | Manages ease of testing two data sources head-to-head |
| Data Source Database | Stores all approved data sources |
| | Stores multiple allowable data sources for specific data |
| | Stores all approved data sources for vendor management and procurement purposes |
| | Stores data source history such as volumes, response time statistics, call patterns, uptime statistics |
| | Used for vendor billing/consumption models and data |
| Vendor Data Intelligence Engine | Manages, monitors, bulk updates data in the intermediate cache |
| | Triggers changes to vendor data acquisition arrangements as needed to maintain minimized cost profile |
| | Manages the intermediate cache |
| | Algorithm to know when to update intermediate cache based on schedules, call volumes, currency of data (required vs. existing) |

TABLE 1-continued

Illustrative Functions of System Architecture Components

| System Architecture Component | Illustrative Functions |
|---|---|
| | Algorithm for purging aging data off intermediate cache |
| | Algorithm to auto-adjust consumption process and model (e.g. from transaction to bulk download) based on traffic patterns, volumes and needs |
| | Notification of consumption model changes |
| Intermediate Cache | Stores data pre-staged or loaded in bulk from outside data sources |
| | Stores data retrieved prior calls to data sources |

Illustrative processing methods that may be executed by the system architecture is included in Table 2 below.

TABLE 2

Illustrative Processing Methods Executed by System Architecture

| Illustrative Data Scenario | Illustrative Processing Methods |
|---|---|
| Calling source request can be satisfied via data already obtained and stored in Intermediate Cache | Processing Engine searches Intermediate Cache<br>No need for external data source call(s) |
| Calling source request requires most current data or data is not within Intermediate Cache | Processing Engine requests appropriate data through Second I/O Platform<br>Second I/O Platform makes appropriate data source call(s)<br>Processing Engine processes calling source request<br>Processing Engine updates Intermediate Cache with most current data |
| Intermediate Cache Refresh (as needed basis) | Vendor Data Intelligence Engine monitors Intermediate Cache data and determines need for refresh based on call activity and other events it receives<br>Vendor Data Intelligence Engine triggers appropriate data source calls through Second I/O Platform<br>Vendor Data Intelligence Engine updates Intermediate Cache |
| Intermediate Cache Scheduled Bulk Load | Vendor Data Intelligence Engine processes a bulk data request based upon schedules maintained within it<br>Vendor Data Intelligence Engine triggers appropriate data source calls through Second I/O Platform<br>Vendor Data Intelligence Engine updates Intermediate Cache |

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or programs or by utilizing computer-readable data structures.

FIG. 1 shows apparatus associated with the prior art. The apparatus illustrated in FIG. 1 shows includes calling source 1 calling data source 1, calling source 1 calling data source 2, and calling source 2 calling data source 2. In FIG. 1, each calling source is illustrated transmitting a call directly to the data source.

Figure 2:
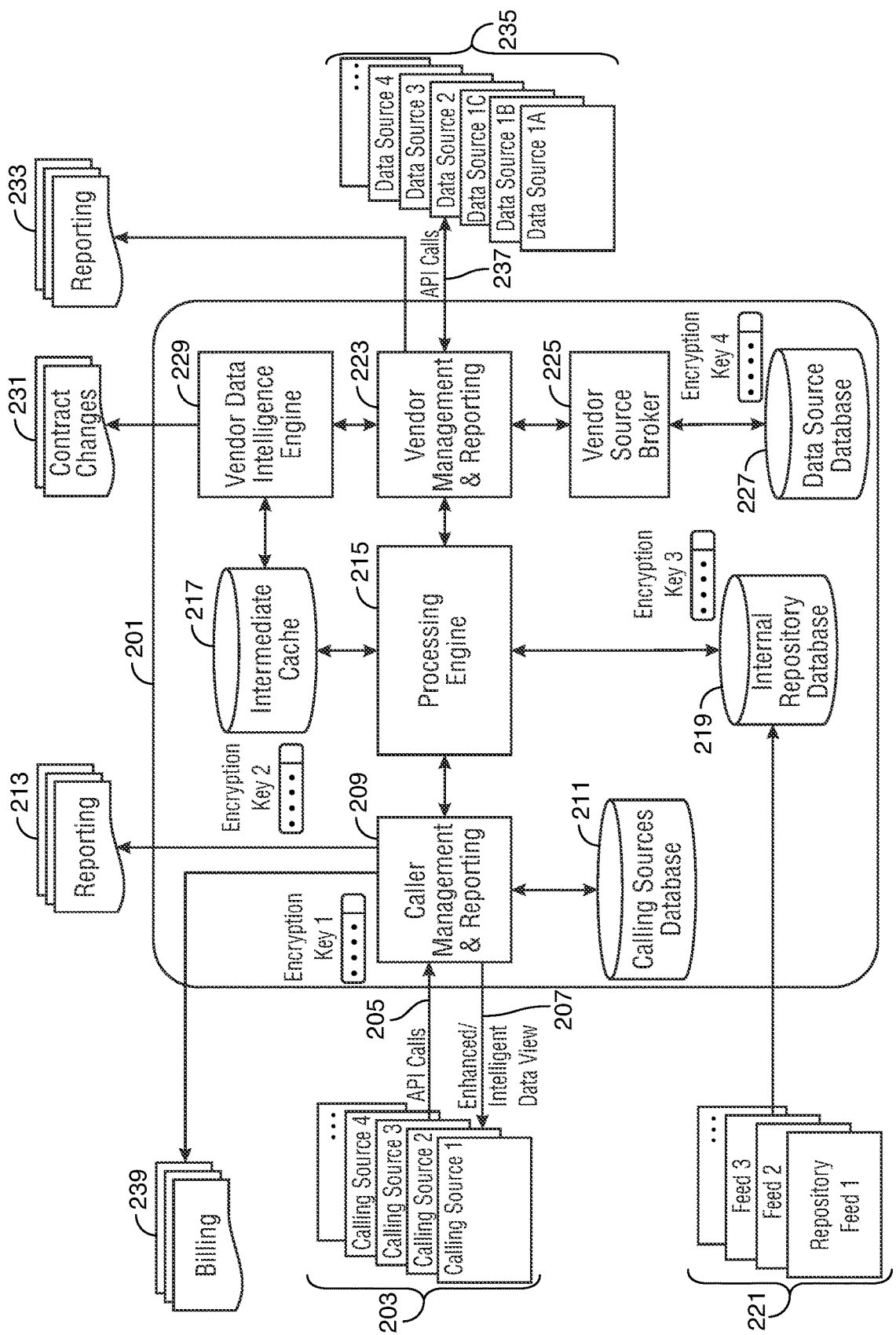
FIG. 2 shows illustrative apparatus and methods in accordance with the invention.

FIG. 2 shows system architecture 201. Systems architecture 201 may have one or more features of the system architecture. System architecture 201 may include apparatus illustrated in FIGS. 3 and 4.

System architecture 201 includes a plurality of components. The plurality of components may include caller management and reporting 209. Caller management and reporting 209 may be the first I/O platform. The plurality of components may include processing engine 215, vendor source broker 225, vendor data intelligence engine 229 and vendor management and reporting 223. Vendor management and reporting 223 may be the second I/O platform. Each of caller management and reporting 209, processing engine 215, vendor source broker 225, vendor data intelligence engine 229 and vendor management and reporting 223 may be an API included in system architecture 201.

The plurality of components included in system architecture 201 may also include one or more databases. The databases may include calling sources database 211, intermediate cache 217, internal repository database 219 and data source database 227. Exemplary communications supported between the plurality of components is illustrated in FIG. 2. Additional communications may be supported between the plurality of components that are not illustrated in FIG. 2. Some or all of the communications between the plurality of components may require encryption of the data at a first component prior to transmission of the data to a second component. Encryption key 1, encryption key 2, encryption key 3 and encryption key 4 illustrate exemplary locations within system architecture 201 where data encryption may be required for communications.

Caller management and reporting 209 may receive data from calling sources 203. Exemplary received data may include calls, such API calls 205, and the call described herein. Caller management and reporting 209 may transmit data to calling sources 203. Exemplary data transmitted may include responses 207. Responses 207 may include an answer, such as a binary answer, as described herein.

Internal Repository Database may be fed by data feeds 221. Reporting 213 may be generated using metrics stored by caller management and reporting 209. Reporting 213 may report on characteristics of data transmission between calling sources 203 and caller management and reporting 209. Reporting 233 may be generated using metrics stored by vendor management and reporting 223. Reporting 223 may report on characteristics of data transmission between vendor management and reporting 223 and data sources 235. Data transmission between vendor management and reporting 223 and data sources 235 may include calls such as API calls 237.

Billing 239 may be based on data stored on caller management and reporting 209. Contract changes 231 may be generated by vendor data intelligence engine 229 based on historical data traffic received from vendor management and reporting 223. Some or all of billing 239, reporting 213, reporting 233 and contract changes 231 may be generated by system architecture 201.

In some embodiments, system architecture 201, reporting 233, contract changes 231, reporting 213, billing 239, calling sources 203 and repository feeds 221 may all be supported by a company. Data sources 235 may represent data sources external to the company.

In some embodiments, system architecture 201 may be a vendor supplying data routing needs to calling sources 203. In some of these embodiments, calling sources 203 may be supported by a company, and the remaining items illustrated in FIG. 2 may be external to the company.

The system architecture, the first I/O platform, the processing engine, the second I/O platform, the vendor source broker and the vendor data intelligence engine may each include one or more computer systems, platforms, and servers. Each of the calling sources database, intermediate cache, data source database and internal repository database may be part of a computer system. The computer systems, platforms, and servers may include one or more of the hardware components illustrated in FIG. 3. The computer systems, serves and platforms may be part of two or more networks, such as a WAN and/or a LAN network as illustrated in FIG. 3.

Exemplary hardware components may include I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices, and machine-readable memory.

Software applications executed by the computer systems, platforms and servers may be stored within non-transitory memory and/or other storage medium. Software applications may provide instructions to the processor that enable the computing system to perform various functions. The instructions may include any of call routing and processing functions described herein. Alternatively, some or all of computer executable instructions of a software application may be embodied in hardware or firmware components of a computer system or server.

Figure 3:
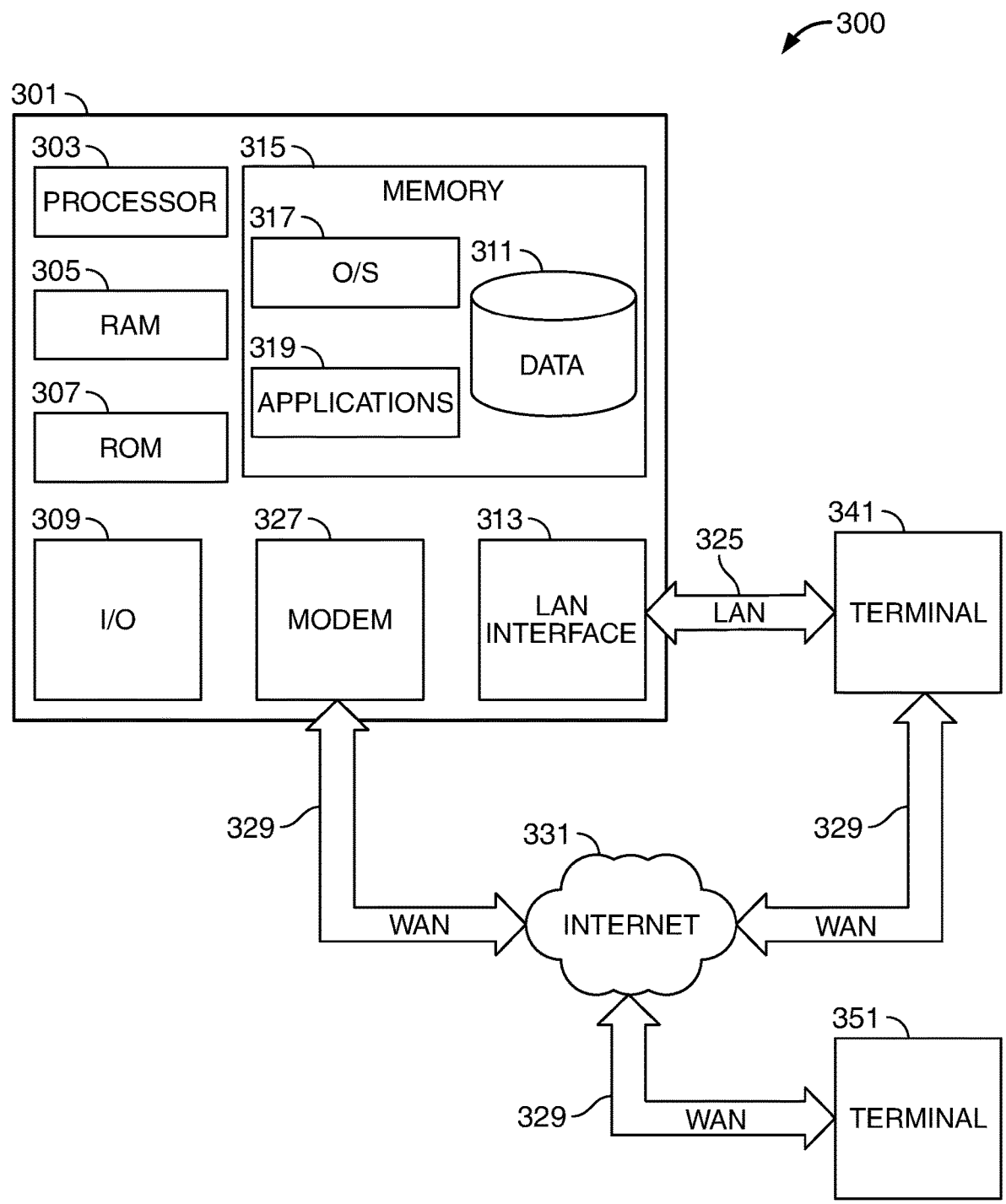
FIG. 3 shows an illustrative block diagram of apparatus in accordance with the invention.

FIG. 3 shows an illustrative block diagram of system 300 that includes computer 301. Computer 301 may alternatively be referred to herein as an "engine," "server" or a "computing device." Computer 301 may be a workstation, desktop, laptop, tablet, smart phone, or any other suitable computing device. Elements of system 300, including computer 301, may be used to implement various aspects of the systems and methods disclosed herein. For example, system architecture 201 may include elements of system 300. Additionally, each of the first I/O platform, the processing engine, the second I/O platform, the vendor source broker and the vendor data intelligence engine may include some or all of apparatus included in system 300.

Computer 301 may have a processor 303 for controlling the operation of the device and its associated components, and may include RAM 305, ROM 307, input/output circuit 309, and a non-transitory or non-volatile memory 315. Machine-readable memory may be configured to store information in machine-readable data structures. The processor 303 may also execute all software running on the computer—e.g., the operating system and/or voice recognition software. Other components commonly used for computers, such as EEPROM or Flash memory or any other suitable components, may also be part of the computer 301.

The memory 315 may be comprised of any suitable permanent storage technology—e.g., a hard drive. The memory 315 may store software including the operating system 317 and application(s) 319 along with any data 311 needed for the operation of the system 300. Memory 315 may also store videos, text, and/or audio assistance files. Calling Sources Database 211, Internal Repository Database 219, Data Source Database 227 and/or Intermediate Cache 217 may have one or more features in common with Memory 315. The data stored in Memory 315 may also be stored in cache memory, or any other suitable memory.

Input/output ("I/O") module 309 may include connectivity to a microphone, keyboard, touch screen, mouse, and/or stylus through which input may be provided into computer 301. The input may include input relating to cursor movement. The input/output module may also include one or more speakers for providing audio output and a video display device for providing textual, audio, audiovisual, and/or graphical output. The input and output may be related to computer application functionality. I/O Module 309 may have apparatus included in one or both of the first I/O platform and the second I/O platform. The first I/O platform and the second I/O platform may also include additional apparatus illustrated in FIG. 3, such as processor 303.

System 300 may be connected to other systems via a local area network (LAN) interface 313. System 300 may operate in a networked environment supporting connections to one or more remote computers, such as terminals 341 and 351. Terminals 341 and 351 may be personal computers or servers that include many or all of the elements described above relative to system 300. The network connections depicted in FIG. 3 include a local area network (LAN) 325 and a wide area network (WAN) 329, but may also include other networks. When used in a LAN networking environment, computer 301 is connected to LAN 325 through a LAN interface or adapter 313. When used in a WAN networking environment, computer 301 may include a modem 327 or other means for establishing communications over WAN 329, such as Internet 331. Connections between System 300 and Terminals 351 and/or 341 may be used for system architecture 201 to communicate one or both of calling sources 203 and Data Sources 235.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 319, which may be used by computer 301, may include computer executable instructions for invoking functionality related to communication, such as e-mail, Short Message Service (SMS), and voice input and speech recognition applications. Application program(s) 319 (which may be alternatively referred to herein as "plugins," "applications," or "apps") may include computer executable instructions for invoking functionality related to performing various tasks. Application programs 319 may utilize one or more algorithms that process received executable instructions, perform power management routines or other suitable tasks. Application programs 319 may utilize one or more decisioning processes for the processing of calls received from calling sources as detailed herein.

Application program(s) 319 may include computer executable instructions (alternatively referred to as "programs"). The computer executable instructions may be embodied in hardware or firmware (not shown). The computer 301 may execute the instructions embodied by the application program(s) 319 to perform various functions.

Application program(s) 319 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with database 311, and any other suitable information, may be stored in memory 315. One or more of applications 319 may include one or more algorithms that may be used to implement features of the disclosure comprising the call processing, routing, augmentation, and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 301 and/or terminals 341 and 351 may also include various other components, such as a battery, speaker, and/or antennas (not shown). Components of computer system 301 may be linked by a system bus, wirelessly or by other suitable interconnections. Components of computer system 301 may be present on one or more circuit boards. In some embodiments, the components may be integrated into a single chip. The chip may be silicon-based.

Terminal 351 and/or terminal 341 may be portable devices such as a laptop, cell phone, Blackberry™, tablet, smartphone, or any other computing system for receiving, storing, transmitting and/or displaying relevant information. Terminal 351 and/or terminal 341 may be one or more data sources or a calling sources. Terminals 315 and 341 may have one or more features in common with apparatus 101. Terminals 315 and 341 may be identical to system 300 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 4:
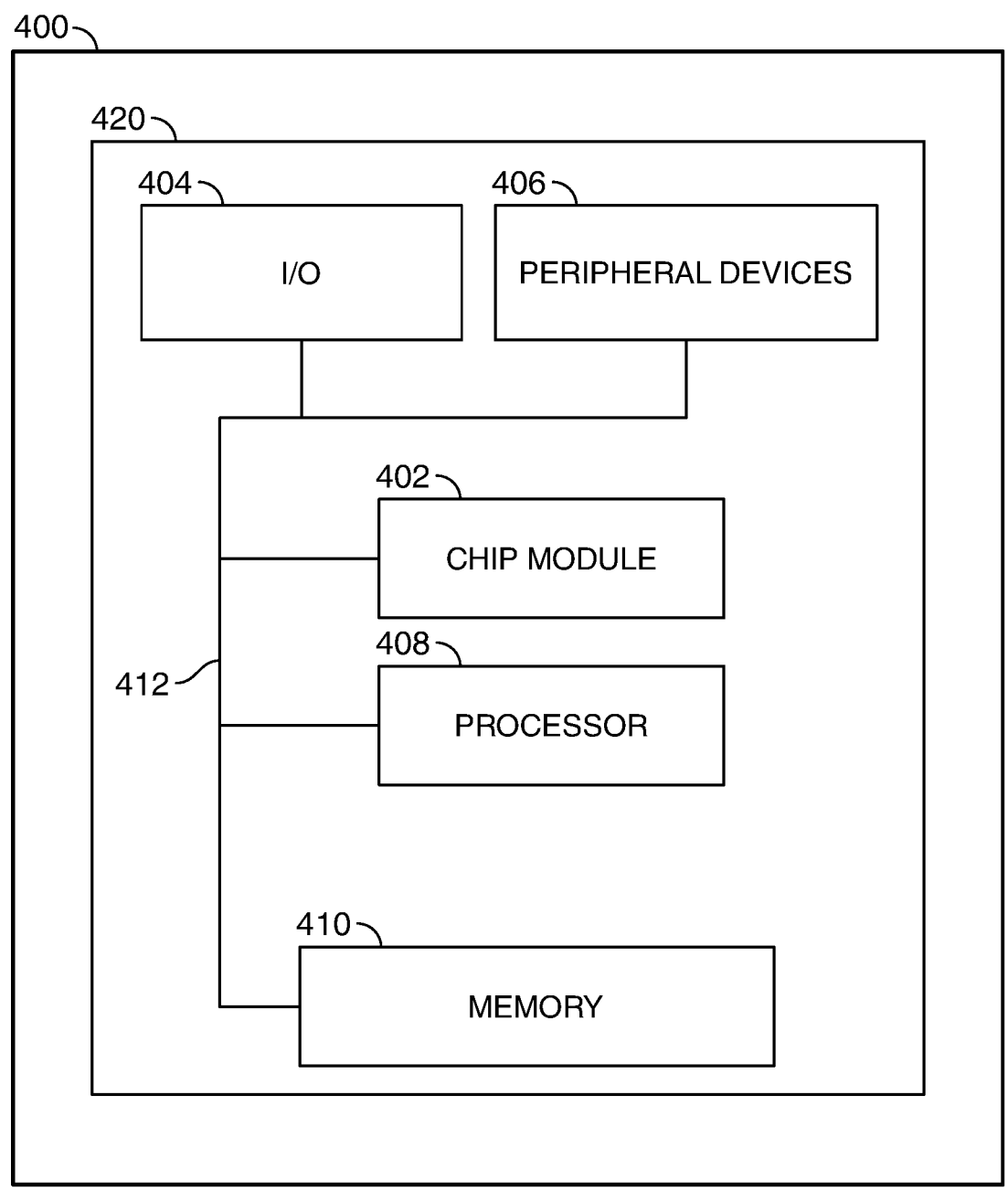
FIG. 4 shows illustrative apparatus that may be configured in accordance with the invention.

FIG. 4 shows illustrative apparatus 400 that may be configured in accordance with the principles of the disclosure. Apparatus 400 may be a computing device. Apparatus 400 may include one or more features of the apparatus shown in FIG. 3. Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data; and machine-readable memory 410.

Machine-readable memory 410 may be configured to store in machine-readable data structures: machine executable instructions, (which may be alternatively referred to herein as "computer instructions" or "computer code"), applications such as applications 319, signals, and/or any other suitable information or data structures.

Components 402, 404, 406, 408 and 410 may be coupled together by a system bus or other interconnections 412 and may be present on one or more circuit boards such as 420. In some embodiments, the components may be integrated into a single chip. The chip may be silicon-based.

Thus, systems and methods for augmentation and routing of calls are provided. Persons skilled in the art will appreciate that the present invention can be practiced by other than the described embodiments, which are presented for purposes of illustration rather than of limitation.

What is claimed is:

1. A system architecture for augmentation and routing of calls requesting data, the system architecture leveraging calling source data, vendor data and internal data, the system architecture comprising:
   a first I/O platform for:
      receiving a call from a calling source, the call including a first data request and a transaction indicator, wherein the call is received from an IP address and the transaction indicator specifies how current a piece of data must be to satisfy the first data request; and
      pushing the IP address to a calling sources database;
   the calling sources database for:
      retrieving a calling source indicator and a second data type associated with the IP address; and
      transmitting the calling source indicator and the second data type to the first I/O platform;
   the first I/O platform further configured to:
      augment the call to include a second data request and tagging the call with the calling source indicator, wherein the second data request requests the second data type; and
      after the augmenting, transmit the call to a processing engine;
   the processing engine for receiving the call from the first I/O platform and, in response to receiving the call:
      transmitting the first data request, the second data request and the transaction indicator to an intermediate cache;
      in response to receiving, from the intermediate cache, data for fulfilling the first data request, the second data request and the transaction indicator, populating the call with the received data and transmitting the call to the first I/O platform for routing to the calling source; and
      in response to receiving a null result from the intermediate cache, transmitting the call to a second I/O platform;
   the second I/O platform for:
      receiving the call from the processing engine;
      in response to receipt of the call from the processing engine, pushing the IP address, the first data request, the second data request and the transaction indicator to a vendor source broker engine;
      receiving, from the vendor source broker engine, a data source and a call format;
      formatting the call to conform to the call format;
      after the formatting, pushing the call to the data source;
      receiving from the data source a response to the call, the response including first data and second data;
      transmitting to the vendor source broker engine performance metrics associated with the response received from the data source; and
      transmitting the response, in parallel, to both a vendor data intelligence engine and the processing engine;
   the vendor data intelligence engine for:
      receiving the response from the second I/O platform; and
      executing a determination whether to store, in the intermediate cache, one or both of the first data and the second data;
   the processing engine for:
      receiving the response from the second I/O platform and extracting from the response the first data and the second data;
      pushing to an internal repository database the calling source, the first data and the second data;
      receiving, from the internal repository database, a third data field loaded with third data;
      processing the first data, the second data and the third data to output a binary response, the binary response not including the first data, the second data or the third data; and
      transmitting the binary response to the first I/O platform; and
   the first I/O platform for routing the binary response to the calling source.

2. The system architecture of claim 1, wherein the third data stored in the internal repository overrides the first data and the second data received from the data source, the system architecture further comprising:
   a processing of the first data and the second data, by the processing engine, resulting in a second binary output; and
   the processing of the first data, the second data and the third data, by the processing engine, resulting in the first binary output.

3. The system architecture of claim 1 wherein:
   the call received by the first I/O platform from the calling source includes a first data field for receiving the first data requested in the first data request;
   the augmenting of the call by the first I/O platform further comprises the first I/O platform adding a second data field to the call, the second data field for receiving the second data requested in the second data request; and the response received from the data source includes the first data field populated with the first data and the second data field populated with the second data.

4. The system architecture of claim 1 further comprising the intermediate cache, the intermediate cache for:

storing a plurality of data pushed to the intermediate cache by the vendor data intelligence engine, each piece of stored data being associated with a time stamp, the time stamp being a time at which the piece of stored data was generated;

receiving the first data request, the second data request and the transaction indicator from the processing engine;

for the first data request, determining if data stored in the intermediate cache satisfies the first data request and the transaction indicator;

for the second data request, determining if data stored in the intermediate cache satisfies the second data request and the transaction indicator; and when the intermediate cache is determined to store data satisfying the first data request, the second data request and the transaction indicator, transmitting to the processing engine data for fulfilling the first data request, the second data request and the transaction indicator.

5. The system architecture of claim 4 wherein the intermediate cache transmits a null result to the processing engine when the intermediate cache determines that the intermediate cache does not store data satisfying the first data request and the transaction indicator, and that the intermediate cache does not store data satisfying the second data request and the transaction indicator.

6. The system architecture of claim 1 further comprising the vendor source broker engine, the vendor source broker engine for:

receiving from the second I/O platform the IP address, the first data request, the second data request and the transaction indicator;

pulling from a database one or more prestored requirements associated with the IP address;

identifying the data source, the data source satisfying the one or more prestored requirements associated with the IP address; and transmitting to the second I/O platform the data source and the call format.

7. The system architecture of claim 1 further comprising the vendor source broker engine, the vendor source broker engine for:

receiving from the second I/O platform the IP address, the first data request, the second data request and the transaction indicator;

pulling from a database one or more prestored requirements associated with the first data request;

identifying the data source, the data source satisfying the one or more prestored requirements associated with the first data request; and transmitting to the second I/O platform the data source and the call format.

8. The system architecture of claim 1 further comprising the vendor source broker engine, the vendor source broker engine for:

receiving, from the second I/O platform, the performance metrics associated with the data source response;

storing the performance metrics together with historical performance metrics of the data source;

processing the performance metrics and the historical performance metrics to determine if the data source fails to meet a threshold performance indicator; and if the data source is determined to have failed to meet the threshold performance indicator, removing the data source from a list of approved data sources stored by the vendor source broker engine.

9. The system architecture of claim 1 wherein the vendor data intelligence engine is further configured to:

temporarily store all data received from the second I/O platform in a holding file, the holding file automatically purging each piece of data in the holding file when the piece of data has been stored in the holding file for more than a predetermined time period;

receive the response from the second I/O platform;

store the response in the holding file; and push the response to the intermediate cache, for storage in the intermediate cache, when the holding file is determined to be storing one or more pieces of information identical to the response.

10. The system architecture of claim 1 wherein the vendor data intelligence engine is further configured to:

receive, from the second I/O platform, a plurality of calls, the plurality of calls including the call;

temporarily store the plurality of calls received from the second I/O platform in a holding file, the holding file automatically purging each of the plurality of calls in the holding file when the each of the plurality of calls has been stored in the holding file for more than a predetermined time period;

when the holding file is determined to be storing a predetermined number of calls, each of the predetermined number of calls requesting an identical piece of information, generating a request to the second I/O platform for the piece of information; and recurrently transmitting the request to the second I/O platform upon a lapse of a time period.

11. A system architecture for augmentation and routing of calls requesting data, the system architecture comprising:

a first I/O platform for:

receiving a call from a calling source, the call including a first data request, a transaction indicator and a first data source, wherein the call is received from an IP address and the transaction indicator specifies how current a piece of data must be to satisfy the first data request; and pushing the IP address to a calling sources database;

the calling sources database for:

retrieving a calling source indicator and a second data type associated with the IP address; and transmitting the calling source indicator and the second data type to the first I/O platform;

the first I/O platform further configured to:

augment the call to include a second data request and tagging the call with the calling source indicator, wherein the second data request requests the second data type; and after the augmenting, transmit the call to a processing engine;

the processing engine for receiving the call from the first I/O platform and, in response to receiving the call:

transmitting the first data request, the second data request and the transaction indicator to an intermediate cache;

in response to receiving, from the intermediate cache, data for fulfilling the first data request, the second data request and the transaction indicator, populating the call with the received data and transmitting the call to the first I/O platform for routing to the calling source; and in response to receiving a null result from the intermediate cache, transmitting the call to a second I/O platform;

the second I/O platform for:
receiving the call from the processing engine;
in response to receipt of the call from the processing engine, pushing the IP address, the first data request, the second data request, the transaction indicator and the first data source to a vendor source broker engine;

the vendor source broker engine for:
receiving from the second I/O platform the IP address, the first data request, the second data request and the transaction indicator;
pulling from a database a one or more prestored requirements associated with the IP address;
identifying, in the database, a command to overwrite the first data source with a second data source; and
transmitting to the second I/O platform the second data source and a call format associated with the second data source;

the second I/O platform being further configured to:
receive, from the vendor source broker engine, the second data source and the call format;
format the call to conform to the call format;
after the formatting, push the call to the second data source;
receive from the second data source a response to the call, the response including first data and second data;
transmit to the vendor source broker engine performance metrics associated with the response received from the second data source; and
transmit the response, in parallel, to both a vendor data intelligence engine and the processing engine;

the vendor data intelligence engine for:
receiving the response from the second I/O platform; and
executing a determination whether to store, in the intermediate cache, one or both of the first data and the second data;

the processing engine for:
receiving the response from the second I/O platform and extracting from the response the first data and the second data;
pushing to an internal repository database the calling source, the first data and the second data;
receiving, from the internal repository database, a third data field loaded with third data;
processing the first data, the second data and the third data to output a binary response, the binary response not including the first data, the second data or the third data; and
transmitting the binary response to the first I/O platform; and the first I/O platform for routing the binary response to the calling source.

12. The system architecture of claim 11 wherein the formatting of the call, performed by the second I/O platform, includes overwriting, in the call, the first data source with the second data source.

13. The system architecture of claim 11 further comprising the calling source configured to:

generate the call, the call being populated with the first data request, the transaction indicator and the first data source;
transmit the call to the first I/O platform; and
receive the binary response from the first I/O platform.

14. The system architecture of claim 11 wherein:
the call received by the first I/O platform from the calling source includes a first data field for receiving the first data requested in the first data request;
the augmenting of the call by the first I/O platform further comprises the first I/O platform adding a second data field to the call, the second data field for receiving the second data requested in the second data request; and
the response received from the second data source includes the first data field populated with the first data and the second data field populated with the second data.

15. The system architecture of claim 11 further comprising the intermediate cache, the intermediate cache for:
storing a plurality of data pushed to the intermediate cache by the vendor data intelligence engine, each piece of stored data being associated with a time stamp, the time stamp being a time at which the piece of stored data was generated;
receiving the first data request, the second data request and the transaction indicator from the processing engine;
for the first data request, determining if data stored in the intermediate cache satisfies the first data request and the transaction indicator;
for the second data request, determining if data stored in the intermediate cache satisfies the second data request and the transaction indicator; and
when the intermediate cache is determined to store data satisfying the first data request, the second data request and the transaction indicator, transmitting to the processing engine data for fulfilling the first data request, the second data request and the transaction indicator.

16. The system architecture of claim 15 wherein the intermediate cache transmits a null result to the processing engine when the intermediate cache determines that the intermediate cache does not store data satisfying the first data request and the transaction indicator, and that the intermediate cache does not store data satisfying the second data request and the transaction indicator.

17. A method for providing routing and augmentation of calls requesting data, the method comprising:
receiving, at a first I/O platform, a call from a calling source, the call including a first data request and a transaction indicator, wherein the call is received from an IP address and the transaction indicator specifies how current a piece of data must be to satisfy the first data request; and
pushing, using the first I/O platform, the IP address to a calling sources database;
retrieving, at the calling sources database, a calling source indicator and a second data type associated with the IP address;
transmitting, from the calling sources database to the first I/O platform, the calling source indicator and the second data type;
augmenting, at the first I/O platform, the call to include a second data request and tagging the call with the calling source indicator, wherein the second data request requests the second data type;
after the augmenting, transmitting the call from the first I/O platform to a processing engine;

receiving the call at the processing engine and, in response to receiving the call, the processing engine performing the method steps of:
  transmitting the first data request, the second data request and the transaction indicator to an intermediate cache;
  in response to receiving, from the intermediate cache, data for fulfilling the first data request, the second data request and the transaction indicator, populating the call with the received data and transmitting the call to the first I/O platform for routing to the calling source; and
  in response to receiving a null result from the intermediate cache, transmitting the call to a second I/O platform;
receiving the call from the processing engine at the second I/O platform;
in response to receipt of the call from the processing engine, the second I/O platform performing the method steps of:
  pushing the IP address, the first data request, the second data request and the transaction indicator to a vendor source broker engine;
  receiving, from the vendor source broker engine, a data source and a call format;
  formatting the call to conform to the call format;
  after the formatting, pushing the call to the data source;
  receiving from the data source a response to the call, the response including first data and second data;
  transmitting to the vendor source broker engine performance metrics associated with the response received from the data source; and
  transmitting the response, in parallel, to both a vendor data intelligence engine and the processing engine;
receiving, at the vendor data intelligence engine, the response from the second I/O platform;
executing, at the vendor data intelligence engine, a determination whether to store, in the intermediate cache, one or both of the first data and the second data;
receiving, at the processing engine, the response from the second I/O platform and using the processing engine to extract from the response the first data and the second data;
pushing from the processing engine to an internal repository database the calling source, the first data and the second data;
the processing engine receiving, from the internal repository database, a third data field loaded with third data;

the processing engine processing the first data, the second data and the third data to output a binary response, the binary response not including the first data, the second data or the third data;
transmitting, from the processing engine to the first I/O platform, the binary response; and
the first I/O platform routing the binary response to the calling source.

18. The method of claim 17 further comprising:
the calling source generating the call, the call being populated with the first data request and the transaction indicator;
the calling source transmitting the call to the first I/O platform; and
the calling source receiving the binary response from the first I/O platform; wherein the call generated by the calling source does not identity a data source from which the data is to be obtained.

19. The method of claim 17 wherein:
the call received by the first I/O platform from the calling source includes a first data field for receiving the first data requested in the first data request;
the augmenting of the call by the first I/O platform further comprises the first I/O platform adding a second data field to the call, the second data field for receiving the second data requested in the second data request; and
the response received from the data source includes the first data field populated with the first data and the second data field populated with the second data.

20. The method of claim 17 further comprising the intermediate cache performing the methods steps of:
receiving the first data request, the second data request and the transaction indicator from the processing engine;
for the first data request, determining if data stored in the intermediate cache satisfies the first data request and the transaction indicator and for the second data request, determining if data stored in the intermediate cache satisfies the second data request and the transaction indicator; and
when the intermediate cache is determined to store data satisfying the first data request, the second data request and the transaction indicator, transmitting to the processing engine data for fulfilling the first data request, the second data request and the transaction indicator.

* * * * *